United States Patent Office 3,445,428
Patented May 20, 1969

3,445,428
PROCESS FOR THE PREPARATION OF POLY-CARBONATES CONTAINING REPEATING BIS (HYDROXYARYL CARBONAMIDE) ALKYLENE UNITS
Ludwig Bottenbruch Krefeld-Bockum, Claus Wulff, Krefeld, and Hermann Schnell, Krefeld-Urdingen, Germany, assignors to Farbenfabriken Bayer Aktiengesellschaft, Leverkusen, Germany, a corporation of Germany
No Drawing. Filed Dec. 28, 1965, Ser. No. 517,118
Claims priority, application Germany, Dec. 31, 1964,
F 44,860
Int. Cl. C08g 17/13, 51/66
U.S. Cl. 260—47          9 Claims

ABSTRACT OF THE DISCLOSURE

A process which comprises reacting bis(hydroxyaryl) compounds, optionally in admixture with other aromatic, aliphatic or cycloaliphatic dihydroxy compounds, with a carbonate precursor characterized in that as the bis(hydroxyaryl) compound, a bis(hydroxyaryl-carbonamide) alkane is used, at least in part, in which the two hydrogen atoms of the nitrogen atoms are substituted by inert organic radicals.

---

The present invention relates to polycarbonates, particularly to polycarbonates having an improved coloring capacity and more particularly to colored polycarbonates.

It is known to react bis-(hydroxyaryl) compounds, especially bis-(hydroxyaryl)-alkanes, cycloalkanes, ethers, sulphides, sulphones, sulphoxides, ketones and amines and other polycyclic aromatic bishydroxy compounds, either alone or in admixture with other aromatic aliphatic or cycloaliphatic dihydroxy compounds, with derivatives of carbonic acid, such as phosgene and its polymers, carbonic acid esters or carbonic acid compounds yielding carbonic acid esters, to give valuable, high molecular, linear, thermoplastic polycarbonates. These polycarbonates possess, besides good mechanical and electrical properties, also a great stability towards a great number of organic compounds. However, due to the stability of these polycarbonates, they are extremely difficult to color. Consequently colored molded articles were heretofore usually produced by incorporating an organic dye into the polycarbonate resin by conventional compounding techniques. For example, the organic dye and pelletized polycarbonate resin were tumbled together to attain an initial dispersion and thereafter charged to a conventional screw type extruder in which the resin is fluxed and sheared to achieve complete and uniform dispersion of the colorant. The subsequent coloring of molded articles which is often technically more advantageous, has been preformed by the technique known as dip dyeing in which the preformed article is immersed in a dye solution of moderate temperatures. This procedure besides being time consuming results in colored articles which cannot be subjected to high temperatures at which polycarbonates are uniquely stable without suffering severe color deterioration.

Therefore, it is an object of this invention to provide polycarbonates having an improved coloring capacity. It is another object of this invention to provide polycarbonates which are dispersible with dyestuffs. It is still another object of this invention to provide colored polycarbonates. It is a further object of this invention to provide colored polycarbonates which are stable at elevated temperatures without suffering severe color deterioration.

The foregoing objects and others which will become apparent from the following description are accomplished in accordance with this invention, generally speaking, by reacting carbonic acid derivatives with bis-(hydroxyarylcarbonamide)-alkanes having the general Formula I

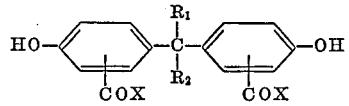

to form a high molecular weight linear polycarbonate having the recurring units II

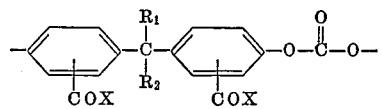

wherein $R_1$ and $R_2$ are hydrogen or monovalent hydrocarbon radicals containing up to about 12 carbon atoms, for example, alkyl radicals, such as methyl, ethyl, propyl, isopropyl, butyl, hexyl, octyl, decyl, etc.; aryl radicals, such as phenyl, naphthyl, biphenyl, tolyl, xylyl, etc.; aralkyl radicals, such as benzyl, ethyl phenyl, etc.; cycloalkyl radicals, such as cyclopentyl, cyclohexyl, cyclooctyl, etc. as well as monovalent hydrocarbon radicals containing inert substituents therein such as halogen; X is an amido radical having the structure

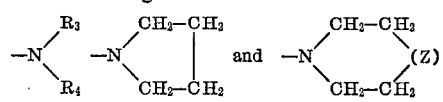

wherein $R_3$ and $R_4$ which may be the same or different are inert monovalent hydrocarbon radicals containing from 1 to 10 carbon atoms, for example, aryl, aralkyl, cycloalkyl and alkenyl radicals such as ethenyl, 1-propenyl, isopropenyl, butenyl and corresponding branched chain isomers thereof, pentenyl, hexenyl, octenyl, etc.; and Z is a divalent radical such as methylene, oxygen, sulfur or an imido radical.

In other words, it has been found that high molecular, linear, thermoplastic polycarbonates having an improved coloring capacity are obtained by reacting bis-(hydroxyaryl-carbonamide)-alkanes are represented by the above Formula I, with derivatives of carbonic acid, such a phosgene, by the conventional methods known in the art for the formation of polycarbonates by phosgenating the dihydroxy compounds in the presence of an acid acceptor.

It is another object of this invention to provide copolycarbonates having similar properties and containing a random distribution of divalent radicals having the structure III

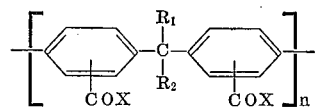

in which $R_1$ and $R_2$ are as defined above and $n$ represents a whole number including one, and of radicals having the structure IV:

in which Y is a divalent aliphatic, cycloaliphatic or aromatic radical and $n'$ represents a whole number including one, the two divalent radicals III and IV being linked through the divalent carbonate radicals V

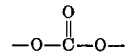

In a preferred embodiment of the invention, the value of $n$ of Formula III is at least 1 percent and no more than about 40 percent of the value of $n'$ of Formula IV.

Furthermore, such co-polycarbonates are preferred, wherein Y of Formula IV represents the radical of a divalent aromatic radical, that is to say radicals derived from dihydric phenols, especially radicals derived from bisphenols of the Formula VI

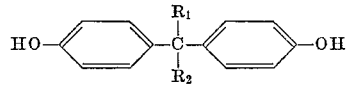

in which $R_1$ and $R_2$ are as defined above.

The co-polycarbonates are obtained by reacting bis-(hydroxyaryl-carbonamide)-alkanes of the Formula I in admixture with dihydroxy compounds of the Formula VII

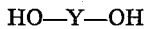

wherein Y is a defined above, with derivatives of carbonic acid as mentioned above, or by reacting polycarbonates of the formula

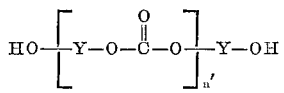

wherein Y and $n'$ are as defined above, with bis-(hydroxyaryl-carbonamide)-alkanes of the Formula I and a derivative of carbonic acid.

The term inert organic radicals includes those substituents which do not participate in the reaction with the carbonic acid derivatives.

Examples of bis-(hydroxyaryl-carbonamide)-alkanes which may be employed are bis-[3-(N,N-dimethyl)-carbonamide - 4-hydroxyphenyl]-methane,
bis-[3-(N,N-diethyl)-carbonamide - 4 - hydroxyphenyl]-methane,
bis-[3-(N,N-dibutyl)-carbonamide - 4 - hydroxyphenyl] methane,
bis-[3-(N,N-dihexyl)-carbonamide - 4 - hydroxyphenyl]-methane,
bis-[2-(N,N-dimethyl)-carbonamide-4 - hydroxyphenyl]-methane,
bis-[2-(N,N-dipropyl)-carbonamide-4 - hydroxyphenyl]-methane,
bis-[2-(N,N-dibtuyl)-carbonamide - 4 - hydroxyphenyl]-methane,
bis-[2-(N,N-dihexyl)-carbonamide - 4 - hydroxyphenyl]-methane,
bis-[2-(N-methyl, N-ethyl)-carbonamide - 4 - hydroxyphenyl]-methane,
bis-[2-(N-ethyl, N - butyl)-carbonamide - 4 - hydroxyphenyl]-methane,
bis-[3-(N-propyl, N-hexyl)-carbonamide - 4 - hydroxyphenyl]-methane,
bis-[3-(N-methyl, N-butyl)-carbonamide - 4 - hydroxyphenyl]-methane,
bis-[3-(N,N-diphenyl)-carbonamide - 4-hydroxyphenyl]-methane,
bis-[3-(N,N,-ditolyl)-carbonamide - 4 - hydroxyphenyl]-methane,
bis-[3-(N,N-dixylyl)-carbonamide - 4 - hydroxyphenyl]-methane,
bis-[2-(N-methyl, N-phenyl)-carbonamide - 4 - hydroxyphenyl]-methane,
bis-[2-(N-ethyl, N-tolyl)-carbonamide-4-hydroxyphenyl]-methane,
bis-[2-(N-butyl, N-tolyl)-carbonamide - 4 - hydroxyphenyl]-methane,
2,2-bis-[3-(N,N-diethyl) - carbonamide - 4 - hydroxyphenyl]propane,
2,2 - bis-[3-(N,N - dihexyl)-carbonamide - 4 - hydroxyphenyl]-propane,
2,2-bis-[2-(N,N - dipropyl)-carbonamide - 4 - hydroxyphenyl]-propane,
2,2-bis-[2-(N - methyl, N-ethyl)-carbonamide-4-hydroxyphenyl]-propane,
2,2-bis-[3-(N-propyl,N-hexyl)-carbonamide - 4-hydroxyphenyl]-propane,
2,2 - bis-[3-(N,N - ditolyl)-carbonamide - 4 - hydroxyphenyl]-propane,
2,2-bis-[2-(N-ethyl, N-tolyl)-carbonamide-4 - hydroxyphenyl]-propane,
1,1 - bis-[3-(N,N-dibutyl)-carbonamide - 4 - hydroxyphenyl]-1-phenyl ethane,
1,1,-bis-[2-(N,N-dimethyl)-carbonamide - 4 - hydroxyphenyl]-1-phenyl ethane,
1,1-bis-[2-(N-methyl, N-ethyl)-carbonamide-4-hydroxyphenyl]-1-phenyl ethane,
1,1-bis-[3-(N-methyl, N-butyl)-carbonamide-4-hydroxyphenyl]-1-phenyl ethane,
1,1 - bis-[3-(N,N-dixylyl)-carbonamide - 4 - hydroxyphenyl]-1-phenyl ethane,
1,1-bis-[2-(N-butyl, N-tolyl)-carbonamide - 4 - hydroxyphenyl]-1-phenyl ethane,
2,2 - bis-[3-(N,N-dihexyl)-carbonamide - 4 - hydroxyphenyl]-butane,
2,2 - bis[2-(N,N-dibutyl)-carbonamide - 4 - hydroxyphenyl]-butane,
2,2-bis-[2-(N-ethyl, N-butyl)-carbonamide - 4-hydroxyphenyl]-butane,
2,2-bis-[3-(N,N-diphenyl)-carbonamide-4-hydroxyphenyl]-butane,
2,2-bis-[2-(N-methyl, N-phenyl)-carbonamide-4-hydroxyphenyl]-butane,
2,2-bis-[3-(N,N-diethyl)-carbonamide-4-hydroxyphenyl]-pentane,
2,2-bis-[2-(N,N-dihexyl)-carbonamide-4-hydroxyphenyl]-pentane,
2,2-bis-[3-(N-methyl, N-butyl)-carbonamide-4-hydroxyphenyl]-pentane,
2,2-bis-[3-(N,N-ditolyl)carbonamide-4-hydroxyphenyl]-pentane,
2,2-bis-[2-(N-ethyl, N-tolyl)-carbonamide-4-hydroxyphenyl]-pentane,
3,3-bis-[3-(N,N-dibtuyl)-carbonamide-4-hydroxyphenyl]-pentane,
3,3-bis-[2-(N,N-dimethyl)-carbonamide-4-hydroxyphenyl]-pentane,
3,3-bis-[2-(N-ethyl, N-butyl)-carbonamide-4-hydroxyphenyl]-pentane,
3,3-bis-[3-(N,N-diphenyl)-carbonamide-4-hydroxyphenyl]-pentane,
3,3-bis-[2-(N-methyl, N-phenyl)-carbonamide-4-hydroxyphenyl]-pentane,
2,2-bis-[3-(N,N-dihexyl)-carbonamide-4-hydroxyphenyl]-3-methyl butane,
2,2-bis[2-(N,N-dipropyl)-carbonamide-4-hydroxyphenyl]-3-methyl butane,
2,2-bis-[3-(N-propyl, N-hexyl)-carbonamide-4-hydroxyphenyl]-3-methyl butane,
2,2-bis-[3-(N,N-dixylyl)-carbonamide-4-hydroxyphenyl]-3-methyl butane,
2,2-bis-[3-(N,N-diethyl)-carbonamide-4-hydroxyphenyl]-4-methyl butane,
2,2-bis-[2-(N,N-dibutyl)-carbonamide-4-hydroxyphenyl]-4-methyl butane,
2,2-bis-[2-(N-methyl, N-ethyl)-carbonamide-4-hydroxyphenyl]-4-methyl butane,
2,2-bis-[3-(N,N-diphenyl)-carbonamide-4-hydroxyphenyl]-4-methyl butane,
2,2-bis-[2-(N-methyl, N-phenyl)-carbonamide-4-hydroxyphenyl]-4-methyl butane,
2,2-bis-[2-(N-butyl, N-tolyl)-carbonamide-4-hydroxyphenyl]-4-methyl butane,
2,2-bis-[3-(N,N-dibutyl)-carbonamide-4-hydroxyphenyl]-heptane,
2,2-bis-[2-(N,N-dihexyl)-carbonamide-4-hydroxyphenyl]-heptane,
2,2-bis-[3-(N-methyl, N-butyl)-carbonamide-4-hydroxyphenyl]-heptane,
2,2-bis-[2-(N-ethyl, N-tolyl)-carbonamide-4-hydroxyphenyl]-heptane, 4,4-bis-[3-(N,N-dihexyl)-carbonamide-4-hydroxyphenyl]-heptane,
4,4-bis-[2-(N,N-dimethyl)-carbonamide-4-hydroxyphenyl]-heptane,
4,4-bis-[2-(N-ethyl, N-butyl)-carbonamide-4-hydroxyphenyl]-heptane,
4,4-bis-[3-(N,N-ditolyl)-carbonamide-4-hydroxyphenyl]-heptane,
4,4-bis-[2-(N-butyl, N-tolyl)-carbonamide-4-hydroxyphenyl]-heptane,
2,2-bis-[3-(N,N-diethyl)-carbonamide-4-hydroxyphenyl]-tridecane,
2,2-bis-[2-(N,N-dipropyl)-carbonamide-4-hydroxyphenyl]-tridecane,
2,2-bis-[3-(N-propyl, N-hexyl)-carbonamide-4-hydroxyphenyl]-tridecane,
2,2-bis-[3-(N,N-dixylyl)-carbonamide-4-hydroxyphenyl]-tridecane,
2,2-bis-[2-(N-methyl, N-phenyl)-carbonamide-4-hydroxyphenyl]-tridecane,
1,1-bis-[3-(N,N-dibutyl)-carbonamide-4-hydroxyphenyl]-cyclohexane,
1,1-bis-[2-(N,N-dihexyl)-carbonamide-4-hydroxyphenyl]-cyclohexane,
1,1-bis-[3-(N,N-diphenyl)-carbonamide-4-hydroxyphenyl]-cyclohexane,
1,1-bis[2-(N-butyl, N-tolyl)-carbonamide-4-hydroxyphenyl]-cyclohexane,
bis-[3-(N,N-diallyl)-carbonamide-4-hydroxyphenyl]-methane,
bis-[2-(N,N-diallyl)-carbonamide-4-hydroxyphenyl]-methane,
bis-[2-(N,N-dimethallyl)-carbonamide-4-hydroxyphenyl]-methane,
bis-[3-(N,N-dimethallyl)-carbonamide-4-hydroxyphenyl]-methane,
bis-[3-dipiperidino amido-4-hydroxyphenyl]-methane,
bis-[2-dipiperidino amido-4-hydroxyphenyl]-methane,
2,2-bis-[2-dipiperidino amido-4-hydroxy-phenyl]-propane,
3,3-bis-[3-dipiperidino amido-4-hydroxyphenyl]-pentane,
2,2-bis-[dipiperidino amido-4-hydroxyphenyl]-3-methyl butane,
bis-[3-dipiperazinyl amido-4-hydroxyphenyl]-methane,
bis-[2-dipiperazinyl amido-4-hydroxyphenyl]-methane,
2,2-bis-[3-dipiperazinylamido-4-hydroxyphenyl]-propane,
3,3-bis-[2-dipiperazinyl amido-4-hydroxyphenyl]-pentane,
2,2-bis-[2-dipiperazinyl amido-4-hydroxyphenyl]-3-methyl butane,
bis-[2-dimorpholino amido-4-hydroxyphenyl]-methane,
bis-[2-dipyrrolidino amido-4-hydroxyphenyl]-methane,
bis-[3-dipyrrolidino amido-4-hydroxyphenyl]-methane, and the like.

The bis-(hydroxyaryl-carbonamide)-alkanes can be obtained in a known manner by the reaction of appropriate carbonic acid esters with secondary amines at elevated temperatures, preferably in an inert atmosphere. Starting products suitable for the preparation of the aforesaid compounds are chiefly methylene-bis-salicyclic acid esters.

In addition to the bis-(hydroxyaryl-carbonamide)-alkanes, other bis-(hydroxyaryl) compounds, especially aliphatic and aromatic dihydroxy compounds may be used concurrently in the formation of the new polycarbonates. For example, there may be mentioned as aromatic dihydroxy compounds, the di-monohydroxy arylene alkanes and sulphones, such as 4,4'-dhydroxydiphenylene sulphone,
2,2-dihydroxydiphenylene sulphone,
3,3'-dihydroxydiphenylene sulphone,
4,4'-dihydroxy-2,2'-dimethyl-diphenylene sulphone,
4,4'-dihydroxy-3,3'-dimethyl-diphenylene sulphone,
2,2'-dihydroxy-4,4'-dimethyldiphenylene sulphone,
4,4'-dihydroxy-2,2'-diethyldiphenylene sulphone,
4,4'-dihydroxy-3,3'-diethyldiphenylene sulphone,
4,4'-dihydroxy-2,2-ditert.butyl-diphenylene sulphone,
4,4'-ihydroxy-3,3'-ditert.butyl-diphenylene sulphone,
2,2'-dihydroxy-1,1'-dinaphthylene sulphone,
4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-alpha-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane,
2,2-(4,4'-dihydroxy-diphenylene)-4-methyl-pentane,
2,2-(4,4'-dihydroxy-diphenylene)-heptane,
2,2-(4,4-dihydroxy-diphenylene)-octane,
2,2-(4,4'-dihydroxy-diphenylene)-nonane,
1,1-(4,4'-dihydroxy-diphenylene)-1-phenyl-ethane,
(4,4'-dihydroxy-diphenylene)-1-(alpha-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-decahydronaphthalene,
2,2-(4,4'-dihydroxy-3,3'-dicyclohexyl-diphenylene)-propane,
2,2-(4,4'-dihydroxy-3-methyl-diphenylene)-propane,
2,2-(4,4'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-2,2'-dimethyl-diphenylene)-propane,
2,2-(4,4'-dihydroxy-3,3'-diphenyl-diphenylene)-propane,
1,1-(4,4'-dihydroxy-3,3'-dimethyl-6,6'-dibutyl-diphenylene)-butane,
1,1-(4,4'-dihydroxy-3,3'-dimethyl-6,6'-ditert.butyl-diphenylene)-ethane,
1,1-(4,4'-dihydroxy-3,3'-dimethyl-6,6'-ditert.butyl-diphenylene)-propane,
1,1-(4,4'-dihydroxy-3,3'-dimethyl-6,6-ditert.butyl-diphenylene)-butane,
1,1-(4,4'-dihydroxy-3,3'-dimethyl-6,6'-ditert.butyl-diphenylene)-isobutane,
1,1-(4,4'-dihydroxy-3,3'-dimethyl-6,6'-ditert.butyl-diphenylene)-heptane,
1,1-(4,4'-dihydroxy-3,3'-dimethyl-6,6'-ditert.butyl-diphenylene)-1-phenyl-methane,
1,1-(4,4'-dihydroxy-3,3'-dimethyl-6,6'-ditert.butyl-diphenylene)-2-methyl-2-pentane,
1,1-(4,4'-dihydroxy-3,3'-dimethyl-6,6'-ditert.butyl-diphenylene)-2-ethyl-2-hexane and
1,1-(4,4' - dihydroxy - 3,3' - dimethyl-6,6'-ditert.amyl-diphenylene) - butane, 3,4-bis-(4-hydroxyphenyl)-hexane, the bis-(4-hydroxyphenyl)-ethers, -sulphides and -sulphones as well as bis-(4-hydroxyphenyl)-ketones and -amines as well as the compounds of the mentioned type which are substituted in the aromatic rings by conventional inert substituents, such as alkyl, cycloalkyl or aryl radicals, alkoxy groups, halogen atoms, etc.

The new polycarbonates may also have co-condensed therewith other aromatic dihydroxy compounds, such as, for example, hydroquinone, resorcinol and pyrocatechol, 2,2'-dihydroxy-diphenyl, 4,4'-dihydroxy-diphenyl, 1,2-, 1,4-, 1,6- and 2,6-dihydroxynaphthalene and 1,5-dihydroxy-anthracene as well as aliphatic and cycloaliphatic dihydroxy compounds, such as, ethylene glycol, diethylene glycol, triethylene glycol, polyethylene glycol, thiodiglycol, ethylene thiodiglycol, di- and polyethylene glycols produced from propyleneoxide-1,2, m-, o-, and p-xylylene glycol, propanediol-1,3, butanediol-1,3, butanediol-1,4,2-methyl propanediol-1,3, pentanediol-1,5, 2-ethyl propanediol-1,3, hexanediol-1,6, octanediol-1,8, 1-ethyl hexanediol-1,3, cyclohexane - 1,4 - diol, decanediol-1,8, xylylene-1,4-glycol, 4,4'-dihydroxy-ethoxy-diphenyl and 2,2-bis-(4-hydroxy-ethoxy-phenyl)-propane.

These new polycarbonates can be produced in usual manner by the reaction of the dihydroxy compounds with derivatives of carbonic acid. Thus, for example, solutions of bis-(hydroxyaryl-carbonamide)-alkanes can be reacted with phosgene or its derivatives in the presence of acid binding agents, e.g. organic bases, such as dimethylaniline, diethylaniline, trimethylamine and pyridine, or into solutions of bis-(hydroxyaryl-carbonamide)-alkanes in indifferent organic solvents, such as benzine, ligroine, cyclohexane, methylcyclohexane, benzene, toluene, xylene, chloroform, methylene chloride, carbon tetrachloride, trichloroethylene, dichlorethane, methylacetate and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the bis-(hydroxyaryl-carbonamide)-alkanes, preferably in the presence of an excess of a base such as lithium-, sodium-, potassium- and calcium-hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of the phosgene. In some cases it may be advantageous to use, instead of phosgene, bi-chlorocarbonic acid esters of bis-(hydroxyaryl-carbonamide)-alkanes and/or of the other aromatic, aliphatic or cycloaliphatic dihydroxy comopunds which may concurrently be used under corresponding conditions.

In the production of polycarbonates according to the various processes it is advantageous to employ small amounts of reducing agents, for example sodium- or potassium-sulphide, -sulphite and -dithionite or free phenol and p-tert.-butylphenol.

To regulate the molecular weight of the polycarbonates, monofunctional compounds which are capable of reacting with phosgene or with the end groups of the polycarbonates consisting of the chlorocarbonic acid ester group and which act as chain interrupting agents may be added, such as the phenols for instance the phenol, the tert.-butylphenol, the cyclohexylphenol, and 2,2-(4-hydroxyphenyl-4'-methoxyphenyl)-propane, aniline and methylaniline.

The reaction of the bis-(hydroxyaryl-carbonamide)-alkanes with phosgene or of the chlorocarbonic esters of the bis-(hydroxyaryl-carbonamide)-alkanes may be carried out at room temperature or at lower or elevated temperatures, that is, to say at temperatures from the freezing point to the boiling point of the mixture. The reaction can also be carried out in the presence of inert wetting agents or emulsifiers or other customary adjuvants. It is also advantageous to add conventional accelerators, especially tert.-amines or their salts.

Even though the conversion of the bis-(hydroxyaryl-carbonamide)-alkanes into high molecular weight polycarbonates has been described in detail, it is within the contemplation of this invention to use bis-(hydroxyaryl-carbonamide)-alkanes in admixture with other aromatic, aliphatic or cycloaliphatic hydroxy compounds.

It has been also found advantageous to include in the aforesaid carbonamide derivatives, co-condensed bis-(hydroxyaryl)-alkanes, whereby the proportion of carbonamide derivatives is smaller than that of the other dihydroxy compounds and lies, preferably, between about 1 and 40 percent, preferably from about 2 to 30 percent by weight, based on the weight of the other dihydroxy compounds.

The high molecular weight thermoplastic polycarbonates thus formed may be introduced into a heated dyebath containing an organic colorant. Any organic colorant may be used such as, for example, triphenyl methane, oxazine, thiazine, nitro and methine dyestuffs, and especially azodyestuffs or anthraquinone dyestuffs and dyestuffs which contain a dihydroxyethylamino group. The group may be bound to an aromatic nucleus of the dyestuff molecule directly or through a bridge member, for eaxmple, an alkylene group, an alkylene-amino group, an imino group or a —CO— or —SO$_2$— group.

Among the azodyestuffs there may be mentioned, for example, diazo-dyestuffs and especialy monoazo-dyestuffs, for example, those of the benzene-azo-benzene, benzene-azo-pyrozolone, benzene-azo-acetoacetic acid arylide or benzene-azo-naphthalene series. The monoazo-dyestuffs may contain further substituents of the kind customary in azo dyestuffs and which do not react with polycarbonates.

Examples of suitable azo-dyestuffs are Amido Naphthol Red 6B (C.I. 57), Amido Naphthol Red (C.I. 31), Brilliant Croceine M (C.I. 252), Metanil Yellow (C.I. 138), Acid Black 10B (C.I. 246), Orange II (C.I. 151), Orange G (C.I. 27), Polar Red (C.I. 430), Ponceau R (C.I. 79), Resorcin Brown (C.I. 234), Chrome Yellow 2G (C.I. 36), Azourbine (C.I. 179), Chrome Black T (C.I. 203), Chrome Blue Black B (C.I. 201), Chrome Blue Black R (C.I. 202), Chrome Red B (C.I. 652), Sudan I (C.I. 24), Monolite Red B (C.I. 44), Naphthylamine Bordeaux (C.I. 82), Metanitroaniline Orange (C.I. 38), Pigment Fast Red HL (C.I. 69), Tartrazine (C.I. 640), Permanent Orange R (C.I. 156), Lake Red C (C.I. 165), Lithol Red R (C.I. 189), Direct Green B (C.I. 593), Direct Brown (C.I. 420), Naphthogene Blue 4R (C.I. 534), Diamine Sky Blue FF (C.I. 518), Benzo Fast Yellow 3GL (C.I. 346), Chrysophenine (C.I. 365), Toluylene Orange R (C.I. 446), Diamine Rose BD (C.I. 128), Benzo Fast Red 8BL (C.I. 278), Benzo Fast Scarlet 4BA (C.I. 327), Diamine Fast Red F (C.I. 419), and the like.

Other dyes which are especially suitable for coloring these polycarbonates are the anthraquinone series, for example, Alizarin II (C.I. 1027), Naphthazarin (1) (C.I. 1019), Alizarine Orange A. C.I. 1033), Alizarine Brown R (C.I. 1035), Alizarine Purpurin (C.I. 1037), Quinolizarin (C.I. 1045), Anthracene Blue WR (C.I. 1062), Alizarine Blue S (C.I. 1066), Alizarine Red S (C.I. 1034), Alizarine Blue SAP (C.I. 1054), Alizarine Blue SAE (C.I. 1053), Alizarine Blue-Black B (C.I. 1085), Cyanathrol R (C.I. 1076), Alizarine Rubinol R (C.I. 1091), Cibanone Blue 3G (C.I. 1173), Pyrazoleanthrone Yellow (C.I. 1122) and the like. (C.I. is always referred to 1st edition.)

The quantity of organic colorant employed is not at all critical and can be present in the final colored combination in amounts commensurate with the desired intensity of the color. It has been found that a dyebath containing amounts as small as 0.001 percent up to about 5 percent by weight based on the weight of the bath impart a substantial and pleasing color or tint to the polycarbonate which can be reproduced in successive batches. Preferably the quantity of organic colorant is from about .02 to about 2.0 percent by weight based on the weight of the dyebath. Various shades and tints can also be achieved by employing mixtures of two or more of the organic colorants.

In addition to having an improved coloring capacity for conventional dyestuffs, such as 1,4 - diamino - 2-methoxy - anthraquinone, 1 - N- methylamino-4-amino-anthraquinone and 1 - amino - 2-methyl-anthraquinone, these new polycarbonates exhibit substantially the same solubility in organic solvents as the other polycarbonates, consequently, they can be used with advantage for the production of lacquer coatings and, in particular, for foils, filaments and the like which have to be colored or printed in a subsequent procedure and which are frequently produced from suitable solutions by casting or extruding. Their melts have a lower viscosity than that of the known polycarbonates and, provided they contain, besides the radicals of bis-(hydroxyaryl-carbonamide)-alkanes, also those of other hydroxy compounds, they possess, in comparison with the corresponding homocondensation products, a lower tendency to crystallize. These products are eminently suitable for the production of large molded articles by molding in the hot and, furthermore, for the production of thick clear cast sheets. In addition, the new polycarbonates exhibit excellent emulsifiability and are thus eminently suitable for the preparation of dispersions of all types, such as, for example, for dispersion dyestuffs.

The following examples are given by way of illustration and not by way of limitation. All parts are by weight unless otherwise specified.

EXAMPLE 1

Approximately 92 parts phosgene are introduced, while stirring, within 2 hours into a mixture of about 159.8 parts bisphenol A, about 27.9 parts bis-[3-(N,N-diethyl-carbonamide) - 4 - hydroxyphenyl]-methane, about 2.7 parts p-tert.-butylphenol, about 385 parts methylene chloride, about 640 parts water and about 100 parts sodium hydroxide. About 7 parts of a 4% triethylamine solution and about 2.3 parts of a wetting agent are subsequently added, while stirring is continued. After further stirring for 30 minutes, the organic phase is highly viscous. It is separated and washed with water in a kneader until neutral. After evaporation of the methylene chloride, the resulting polycarbonate is dried at 100° C. in a vacuum. A product is obtained having a relative viscosity of 1.79 (measured on a solution of 5 g. of the product per 1000 cc. methylene chloride at 25° C.) and a softening point of from about 200 to 240° C.

EXAMPLE 2

Approximately 66 parts phosgene are introduced, while stirring within 100 minutes into a mixture of about 119.9 parts bisphenol A, about 10.5 parts bis-[3-(N,N-diethyl-carbonamide)-4-hydroxyphenyl]-methane, about 8.5 parts p-tert. butylphenol, about 292 parts methylene chloride, about 630 parts water and about 75 parts sodium hydroxide. While stirring is continued, there are then added about 6.1 parts of a 4% triethylamine solution and about 1.8 parts of a wetting agent. The product is worked up after 45 minutes as described in Example 1. A product is obtained having a relative viscosity of 1.23 (measured on a solution of 5 g. of the product per 1000 cc. methylene chloride at 25° C.) and a softening point of from about 200 to 220° C.

EXAMPLE 3

Preparation of a mixed condensation product from bisphenol A and methylene-bis-salicylic acid dimorpholide Approximately 44 parts phosgene are introduced, while stirring, into a mixture of about 79.9 parts bisphenol A, about 6.7 parts methylene-bis-salicylic acid dimorpholide, about 1.35 parts p-tert. butylphenol, about 195 parts methylene chloride, about 320 parts water and about 50 parts sodium hydroxide. While stirring is continued, approximately 1.2 parts of a wetting agent and about 3.75 parts of a 4% triethylamine solution are added. The product is worked up after 60 minutes as described in Example 1.

A product is obtained having a relative viscosity of 1.30 (0.5 g./100 ml. methylene chloride).

If in the above procedure the methylene-bis-salicylic acid dimorpholide is replaced by an equivalent quantity methylene-bis-salicylic acid dipiperidide, then there is obtained a polycarbonate which has very similar properties as the aforesaid product of the present process.

The methylene-bis-salicylic acid dimorpholide can be obtained as follows:

Approximately 205 parts methylene-bis-salicylic acid diphenyl ester prepared as described in German Patent 1,138,792 and about 120 parts morpholine are heated under reflux and nitrogen for about 6.5 hours. An additional 20 parts of morpholine are added after 4 hours. The residual amine and the phenol formed are distilled off in a subsequent distillation at 12 mm. Hg. The residue is recrystallized from an aqueous dimethyl formamide solution.

Approximately 145 parts of a product having a melting point between about 240 and 241° C. is obtained having the following analysis: N calculated, 6.91%. N found, 6.77%.

If in the above procedure the morpholine is replaced by the same amount of piperidine, then there is obtained the methylene-bis-salicylic acid dipiperidide having a melting point between 260 and 261° C.

EXAMPLE 4

Approximately 0.02 part of 1,4-diamino-2-methoxy-anthraquinone are dispersed in about 100 parts by volume of water. After the addition of about 2 parts of salicylic acid to the dispersion at a temperature of about 65° C., portions of about 0.5 part of polycarbonate foil prepared from the polycarbonates described in Examples 1 and 2 are introduced into the dyebath, along with a control foil which is produced from pure bisphenol A. The bath is then heated to a temperature of between 90 and 95° C. and maintained at this temperature for about 30 minutes. The foils are then washed first in a 0.04 N sodium hydroxide solution and thereafter with water until neutral. The polycarbonate foil made from pure bisphenol A exhibits only a slight coloration, while the polycarbonate foil produced according to the invention has a deep blue coloration.

EXAMPLE 5

Approximately 0.02 part of 1-methylamino-5-beta-hydroxyethyl-aminoquinone are dispersed in about 100 parts by volume of water. After the addition of about 2 parts of salicylic acid to the dispersion at a temperature of about 65° C., portions of about 0.5 part of polycarbonate foil prepared from the polycarbonates described in Examples 1 and 2 are introduced into the dyebath, along with a control foil which is produced from pure bisphenol A. The bath is then heated to a temperature of between 90 and 95° C. and maintained at this temperature for about 30 minutes. The foils are then washed first in a 0.04 N sodium hydroxide solution and thereafter with water until neutral. The polycarbonate foil made from pure bisphenol A exhibits only a slight coloration, while the polycarbonate foil produced according to the invention has a deep pink coloration.

EXAMPLE 6

Approximately 0.02 part of 1-amino-2-methyl-anthraquinone are dispersed in about 100 parts by volume of water. After the addition of about 2 parts of salicylic acid to the dispersion at a temperature of about 65° C., portions of about 0.5 part of polycarbonate foil prepared from the polycarbonates described in Examples 1 and 2 are introduced into the dyebath, along with a control foil which is produced from pure bisphenol A. The bath is then heated to a temperature of between 90 and 95° C.

and maintained at this temperature for about 30 minutes. The foils are then washed first in a 0.04 N sodium hydroxide solution and thereafter with water until neutral. The polycarbonate foil made from pure bisphenol A exhibits only a slight coloration, while the polycarbonate foil produced according to the invention has a deep orange coloration.

EXAMPLE 7

Approximately 39.8 parts bis-[3-(N,N-diethylcarbonamide)-4-hydroxyphenyl]-methane are dissolved in about 130 parts chloroform and about 60 parts pyridine. Approximately 11 parts phosgene are introduced at 30° C. over a period of about 80 minutes. Stirring is continued for an additional 30 minutes and the highly viscous solution is then added to dilute hydrochloric acid with agitation. After washing several times with dilute hydrochloric acid, the chloroform solution is washed neutral and dried over sodium sulphate. After evaporation of the solvent, a viscous resin having a relative viscosity of 1.25 (0.5 g./ 100 ml. methylene chloride) is recovered.

Although the invention has been described in considerable detail in the foregoing, it is to be understood that such detail is solely for the purpose of illustration and that many variations can be made by those skilled in the art without departing from the spirit and scope of the invention except as set forth in the claims. High molecular thermoplastic polycarbonates in the meaning of the present invention are products having molecular weights of at least about 5000 and especially of more than about 10,000.

What is claimed is:

1. A thermoplastic homopolymeric polycarbonate having a molecular weight of at least 5000 and recurring units

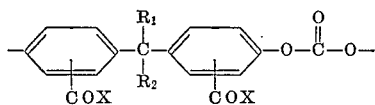

wherein $R_1$ and $R_2$ are selected from the group consisting of hydrogen and monovalent hydrocarbon radicals having up to 12 carbon atoms; X is selected from the group consisting of

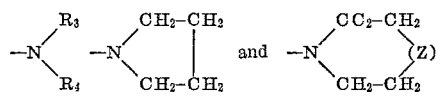

wherein $R_3$ and $R_4$ are inert hydrocarbon radicals having from 1 to 10 carbon atoms; Z is a divalent radical selected from the group consisting of methylene, oxygen, sulfur and imido radicals.

2. The composition of claim 1 wherein $R_3$ and $R_4$ are lower alkyl groups.

3. The composition of claim 1 wherein Z is a methylene group.

4. A thermoplastic co-polycarbonate having a molecular weight of at least about 5000 containing a random distribution of divalent radicals having the structures

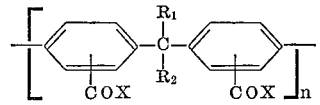

in which $R_1$, $R_2$ and X are as defined in claim 1 and $n$ represents a whole number including one, and of radicals having the structure:

in which Y is a member selected from the group consisting of divalent aliphatic, cycloaliphatic and aromatic radicals and $n'$ represents a whole number including one, the two divalent radicals being linked through divalent carbonate radicals

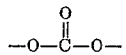

5. The composition of claim 4 wherein the value of $n$ is at least 1 percent and no greater than 40 percent of the value of $n'$.

6. The composition of claim 4 wherein the divalent radical Y is derived from a dihydric phenol.

7. A composition of claim 6 wherein the divalent radical Y is derived from a bisphenol of the formula

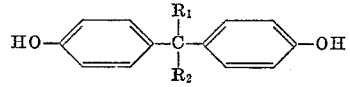

in which $R_1$ and $R_2$ are as defined in claim 1.

8. The polycarbonate of claim 1 which contains a sufficient amount of an organic colorant to impart a color thereto.

9. The polycarbonate of claim 4 which contains a sufficient amount of an organic colorant to impart a color thereto.

References Cited

UNITED STATES PATENTS

| | | | |
|---|---|---|---|
| 3,205,199 | 9/1965 | Preston | 260—47 |
| 3,215,667 | 11/1965 | Caldwell | 260—47 |
| 3,251,806 | 5/1966 | Parker | 260—47 |

SAMUEL H. BLECH, *Primary Examiner.*

PAUL LIEBERMAN, *Assistant Examiner.*

U.S. Cl. X.R.

260—37, 243, 247.2, 268, 294, 326.3, 559